Sept. 6, 1927.
W. L. JACQUES
HANDSAW
Filed March 5. 1926
1,641,168
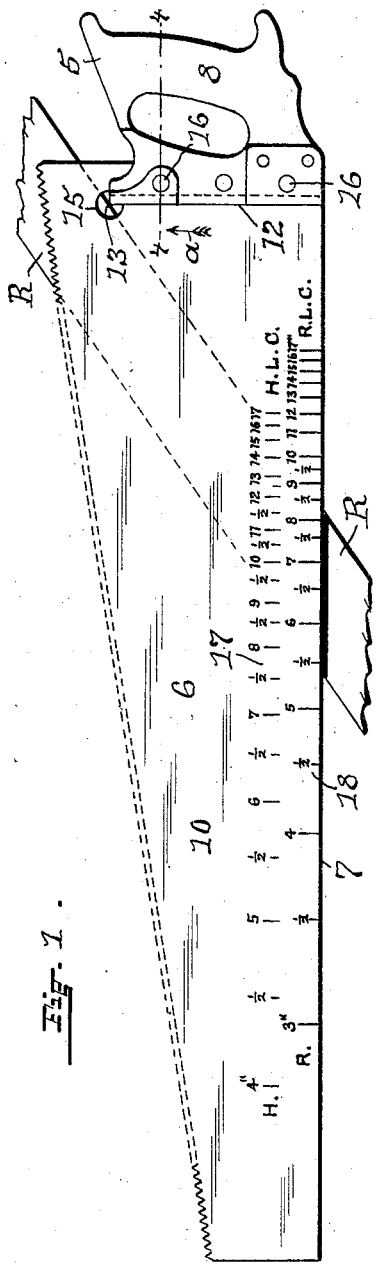
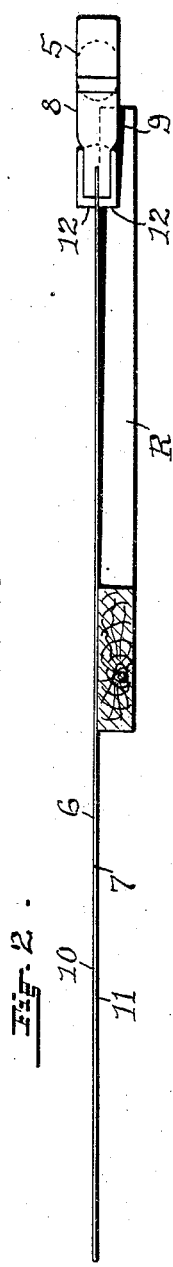
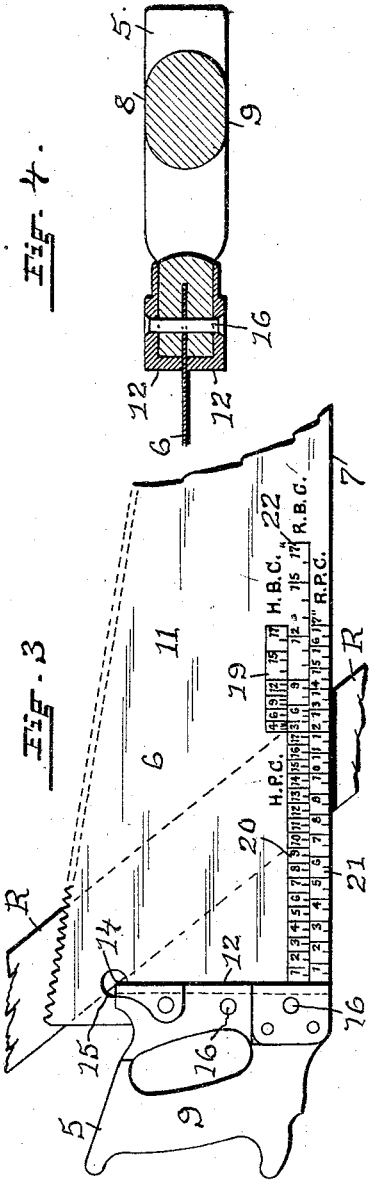
INVENTOR:
William Louis Jacques,
by Chas. H. Luther
ATTORNEY.

Patented Sept. 6, 1927.

1,641,168

UNITED STATES PATENT OFFICE.

WILLIAM LOUIS JACQUES, OF CENTRAL FALLS, RHODE ISLAND.

HANDSAW.

Application filed March 5, 1926. Serial No. 92,495.

My invention has reference to an improvement in saws and more particularly to an improvement in handsaws for sawing wood, as shown in my United States Patent No. 1,381,997, for a handsaw, granted to me June 21, 1921.

The object of my invention is to improve the construction of my previous handsaw, whereby the handle of the handsaw is greatly improved by having L-shaped metal plates which form a try-square on each side of the saw blade, said metal plates extending over and onto the outside of the handle, and rivets extending through the metal plates and handle.

My invention consists in the peculiar and novel construction of the handle of a handsaw, said handsaw handle having details of construction as will be more fully set forth hereinafter and claimed.

Fig. 1 is a right-hand side view of my improved handsaw showing a right-angle raised heel on the handle with the saw blade laid flat on a rafter;

Fig. 2 is a top edge view of the handsaw on the rafter;

Fig. 3 is a left-hand side view of the handsaw showing the saw blade laid flat on the rafter and the end of the saw blade broken away; and Fig. 4 is an enlarged sectional view through the handle and part of the saw blade, taken on line 4—4 of Fig. 1 and showing the L-shaped plates extending over the outside of the handle and that both of the right-angle heels of the plates are in the same positions on the saw blade.

In the drawing 5 indicates a saw handle and 6 a saw blade having a straight back edge 7; 8 indicates the right-hand side and 9 the left-hand side of the handle 5; and 10 indicates the right-hand side and 11 the left-hand side of the saw blade 6. Each side of the handle 5 has a straight raised metal heel 12 on the saw blade 6, at right angles to the straight back edge 7 of the saw blade 6. The heels 12 terminate in corners 13 and 14 which are easily seen through a sight opening 15 in the saw blade 6. The handle 5 is of wood and the straight raised heels 12 are of an L-shaped metal construction, as shown. They are fitted to the wood handle and the whole secured to the saw blade 6 by rivets 16, which extend through the long arms of the plates as shown in Figs. 1, 3 and 4. On the right-hand side 10 of the saw blade 6 are scales 17 and 18 and on the left-hand side 11 of the saw blade 6 are scales 19, 20, 21 and 22. The scale 17 consisting of lines and numerals, has the letter H for hip and the letters H. L. C. for hip level cut; and the scale 18 consisting of lines and numerals, has the letter R for rafter and the letters R. L. C. for rafter level cut. The scale 19 consisting of lines and numerals, has the letters H. B. C. for hip bevel cut; the scale 20 consisting of lines and numerals, has the letters H. P. C. for hip plum cut; the scale 21 consisting of lines and numerals, has the letters R. P. C. for rafter plum cut; and the scale 22 also consisting of lines and numerals, has the letters R. B. C. for rafter bevel cut, as shown in Figs. 1 and 3.

By the use of my improved carpenter's handsaw, the saw may be used as a handsaw and as a try-square, and the wood handle is greatly improved and strengthened.

Having thus described my invention I claim as new:—

A handsaw having a wood handle and a saw blade extending into the wood handle, said wood handle having L-shaped outside metal reinforcing plates, the short arm of each L-shaped plate contacting with the saw blade and the long arm of each L-shaped plate overlapping the wood handle, the short arm of each L-shaped plate forming straight raised metal heels and the long arm of each L-shaped plate forming metal plates on the outside of the wood handle, the outside metal plates extending to the opening in the handle, and means consisting of rivets which extend through the outside metal plates, the wood handle and the saw blade, for the purpose as described.

In testimony whereof, I have signed my name to this specification.

WILLIAM LOUIS JACQUES.